United States Patent
Paris et al.

(10) Patent No.: US 6,966,053 B2
(45) Date of Patent: Nov. 15, 2005

(54) ARCHITECTURE FOR AUTOMATED ANALYSIS AND DESIGN WITH READ ONLY STRUCTURE

(75) Inventors: John Kenneth Floyd Paris, Northridge, CA (US); William Wallace Follett, IV, Agoura, CA (US)

(73) Assignee: The Boeing Company, Chicago, IL (US)

(*) Notice: Subject to any disclaimer, the term of this patent is extended or adjusted under 35 U.S.C. 154(b) by 612 days.

(21) Appl. No.: 09/928,042

(22) Filed: Aug. 10, 2001

(65) Prior Publication Data

US 2003/0033038 A1    Feb. 13, 2003

(51) Int. Cl.$^7$ .............................................. G06F 9/45
(52) U.S. Cl. ............................. 717/143; 706/8; 707/4
(58) Field of Search ........................... 717/143; 706/8; 707/4

(56) References Cited

U.S. PATENT DOCUMENTS

| | | | |
|---|---|---|---|
| 4,227,245 A | * | 10/1980 | Edblad et al. |
| 5,301,270 A | * | 4/1994 | Steinberg et al. ............ 345/866 |
| 5,404,534 A | * | 4/1995 | Foss et al. |
| 5,522,022 A | * | 5/1996 | Rao et al. |
| 5,630,069 A | * | 5/1997 | Flores et al. |
| 5,724,483 A | * | 3/1998 | Gianguido et al. ............. 706/8 |
| 5,732,191 A | * | 3/1998 | Kunemund et al. ............. 706/8 |
| 5,748,966 A | * | 5/1998 | Sato ............................ 717/131 |
| 5,761,509 A | * | 6/1998 | Danforth et al. ............. 717/116 |
| 5,787,440 A | * | 7/1998 | Bakke et al. |
| 5,790,755 A | * | 8/1998 | Pagni et al. ..................... 706/4 |
| 5,809,490 A | * | 9/1998 | Guiver et al. .................. 706/16 |
| 5,963,739 A | * | 10/1999 | Homeier ...................... 717/126 |
| 5,983,016 A | * | 11/1999 | Brodsky et al. ............. 717/104 |
| 6,167,523 A | * | 12/2000 | Strong ........................ 713/201 |
| 6,192,381 B1 | * | 2/2001 | Stiegemeier et al. ........ 715/505 |
| 6,230,315 B1 | * | 5/2001 | Nicholas ..................... 717/104 |
| 6,260,030 B1 | * | 7/2001 | Janabi ............................ 706/4 |
| 6,282,526 B1 | * | 8/2001 | Ganesh .......................... 706/8 |
| 6,341,372 B1 | * | 1/2002 | Datig .......................... 717/136 |
| 6,345,278 B1 | * | 2/2002 | Hitchcock et al. .......... 707/100 |
| 6,389,414 B1 | * | 5/2002 | Delo et al. ..................... 707/4 |
| 6,424,957 B1 | * | 7/2002 | Matranga et al. .............. 706/8 |
| 6,460,042 B1 | * | 10/2002 | Hitchcock et al. ............ 707/10 |
| 6,463,582 B1 | * | 10/2002 | Lethin et al. ................ 717/158 |
| 6,467,052 B1 | * | 10/2002 | Kaler et al. ................... 714/39 |
| 6,484,312 B1 | * | 11/2002 | Morrison .................... 717/146 |
| 6,493,868 B1 | * | 12/2002 | DaSilva et al. ............. 717/105 |
| 6,535,864 B1 | * | 3/2003 | Zahn ........................... 706/47 |
| 6,546,551 B1 | * | 4/2003 | Sweeney et al. ............ 717/154 |
| 6,560,774 B1 | * | 5/2003 | Gordon et al. .............. 717/146 |
| 6,826,748 B1 | * | 11/2004 | Hohensee et al. .......... 717/130 |

(Continued)

OTHER PUBLICATIONS

SNAP Foundation Template, "Using the SNAP Language", Template Software, 1997, Chapter 6.*

(Continued)

Primary Examiner—Todd Ingberg
(74) Attorney, Agent, or Firm—Harness Dickey & Pierce P.L.C.

(57) ABSTRACT

A method and architecture for calculating input values for use in automated analysis and design during the various stages of the design process includes smart defaults. Specific parameter types are defined, some of which are adapted to be specified, or if not specified, calculated by the smart defaults. A tree structure is provided for determining parameter relationships in order to calculate parameter values. The tree structure uses a specific routine to call a smart default each time a parameter value is to be determined, and values are thereby calculated independent of the order of the data inputs.

21 Claims, 4 Drawing Sheets

U.S. PATENT DOCUMENTS

| | | | |
|---|---|---|---|
| 6,862,553 B2 * | 3/2005 | Schwenke et al. | 702/183 |
| 6,883,101 B1 * | 4/2005 | Fox et al. | 713/201 |
| 6,895,573 B2 * | 5/2005 | Nørgaard et al. | 717/100 |

OTHER PUBLICATIONS

SNAP Foundation Template, "Using the SNAP Development Environment", Template Software, 1997, Whole Manual.*

Workflow Process Template, "Using the WFT Development Environment", Template Software, 1997, Whole Manual.*

SNAP Foundation Template, Using the Communication Component, Template Software, 1997, Whole Manual.*

SNAP Foundation Template, "Using the SNAP Permanent Storage Component", Template Software, 1997, Whole Manual.*

Visual C++ 5 Unleashed, Vikkor Toth, 1998, pp. 375-378.*

* cited by examiner

* REQUIRED INPUT

FIG. 9

ARCHITECTURE FOR AUTOMATED ANALYSIS AND DESIGN WITH READ ONLY STRUCTURE

FIELD OF THE INVENTION

The present invention relates generally to design and analysis systems, and more particularly to a method and architecture for determining design and analysis parameters for use during various stages of a design process.

BACKGROUND OF THE INVENTION

The design of many modern systems (e.g., complex aircraft design) continue to grow in size and complexity, such that automation of the processes involved are crucial. As a result, attempts have been made to improve the efficiency of the design process through automation. In particular, the area of multidisciplinary optimization (MDO) attempts to improve the design process by exploiting interactions between different disciplines and components. Design flexibility and reusability of interfaces is essential to improving MDO.

Software products for automating design and/or model assembly by wrapping an additional interface layer (e.g., coded logic) around an analysis package (e.g., Analysis Server® by Phoenix Integration and iSight by Engineers Software, Inc.) are known. However, because of the increasing capabilities of computers and the software that runs on them, the design problems that must be addressed by MDO continue to increase in size and complexity. Specifically, the number of design variables, constraints and disciplines for the typical MDO problem is increasing (e.g., problems may include hundreds of design variables). For example, the code required for a scramjet combustion analysis and design may require over 100 inputs to specify geometry, boundary conditions and run option parameters. A user at the vehicle conceptual design stage may only specify a few input variables, with a software code wrapper component created to define all remaining variables as constants or complex functions of the specified inputs. However, if the user decides to use a different set of inputs, new logic and/or functions must be coded into the wrapper for every set of design variable combinations that changes as a result of the new set of inputs. The flexibility of the wrapped code is limited.

Known software products that automate model assembly by wrapping an additional interface layer around analysis packages traditionally provide analysis code automation using scripting languages (e.g., UNIX, PERL, Tcl, etc.). Users must explicitly define the hierarchical relationship between variables (e.g., by writing an intermediate script that calculates dependent input parameters in the proper order).

Still other systems have been developed to provide user-friendly software tools to enable users to automate analysis codes by pointing and clicking on a Graphical User Interface (GUI) or by using a semi-graphical interface, instead of programming in a lower level scripting language. Essentially, these systems attempt to reduce the expertise level required to wrap codes. However, such systems fail to provide design flexibility throughout the entire design process (i.e., from the conceptual design stage through the preliminary and detailed design stages).

Different needs must also be met at each design level. For example, at the conceptual design stage, a typical user of analysis software is a systems engineer with limited knowledge of software code. Thus, few, if any, design variables will be changed. Only default values are required for the majority of input values for the analysis program. These default values are typically chosen to provide good predicted performance, good solution quality and robust solution convergence. However, the detailed design stage may involve a more knowledgeable user that desires to override default values to refine a particular design. Default values or functions may be readily defined for dependent input parameters that are a function of selected input parameters. However, as the analysis problem becomes more complex, some dependent input parameters are functions of one or more other dependent input parameters or variables. Thus, the relationship between parameters and/or variables rapidly becomes complex and extremely difficult to define by a user.

Thus, known systems for wrapping design/analysis software are time-consuming, prone to errors, restrict the flexibility of the wrapped software module because of hard-coded logic and make module maintenance extremely difficult. For design and analysis problems that contain a large number of input parameters, the determination of the order of parameter calculation requires complex evaluation of all variables. Further, customization is required to reuse the wrapped software modules in connection with different design/analysis problems and applications (i.e., extremely limited plug-and-play reusable module support).

SUMMARY OF THE INVENTION

The present invention provides a method and interface for use in all stages of a design and analysis process to determine parameter values. Generally, the present invention provides automation or "wrapping" of code (the "wrapper") around an analysis program to create flexible plug-and-play interfaces for wrapped software code, as well as maximizing the potential for reusing the wrapped software. The invention further simplifies the wrapping of complex codes having many interdependent input parameters using a recursive branching algorithm to automatically determine the relationships between input parameters. Input parameters may be specified explicitly or computed by the wrapper using default functions depending upon the requirements of a particular application or of the particular design stage. Thus, the present invention provides for ease in changing a design problem definition.

The present invention provides smart defaults for more flexible and robust analysis code operation. These smart defaults enable experienced engineers to wrap their knowledge around the analysis code. In addition, defining different data parameter types, which are used by the recursive branching algorithm, provides simplified specification of complex variable relationships, thereby enhancing the maintainability of wrapped software. Thus, initial wrapping of large problems with complex relationships between variables is simplified, while engineering flexibility after the code has been wrapped is maximized. Further, the number of parameters that a user must specify to run the code is reduced, which is particularly beneficial for less experienced users.

The present invention provides for overriding smart defaults if desired (e.g., by experienced users). For example, an engineer may choose to optimize a design project based upon a selected set of independent design parameters, relying on the wrapper to calculate the remaining input parameters using smart defaults. However, the engineer may then attempt to improve the design by performing a secondary optimization in which a different set of independent parameters is varied. A wrapped software module of the present invention is not only adapted for plug-and-play adaptability to any changes, but is flexible in all modes of operation because relationship hierarchies for parameters are determined "on the fly" based upon user input changes. Essentially, calculated dependent parameters (i.e., smart defaults) are defined based upon local parameter relationships. The order of parameter calculation is determined automatically "on the fly". More specifically, global parameter relationship hierarchy is automatically determined based upon the specification of local parameter relationships.

The smart defaults calculate unspecified parameters based in part on parameter types (e.g., calculates optional parameters not specified). Other parameter types are preferably provided that restrict any overriding or specifying of particular values by, for example, a user, such as those parameter types calculated by the smart defaults using internal functions and values.

Thus, the present invention provides a method for wrapping analysis code to thereby create a flexible interface that enhances plug-and-play modularity, simplifies the specification of complex variable relationships and enhances maintainability of wrapped software. The wrapped analysis code (i.e., the wrapper) automatically determines the relationship between all potential input parameters preferably using a recursive branching algorithm, with specific parameter types defined. The parameter values are calculated using the determined parameter relationships. Any unspecified input parameters (e.g., optional parameters) are determined using smart defaults of the present invention.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. Thus, although the application of the present invention as disclosed herein is described in connection with specific examples, including using specific structures or algorithms, it is not so limited and may be provided in connection with different applications.

Figure 1:
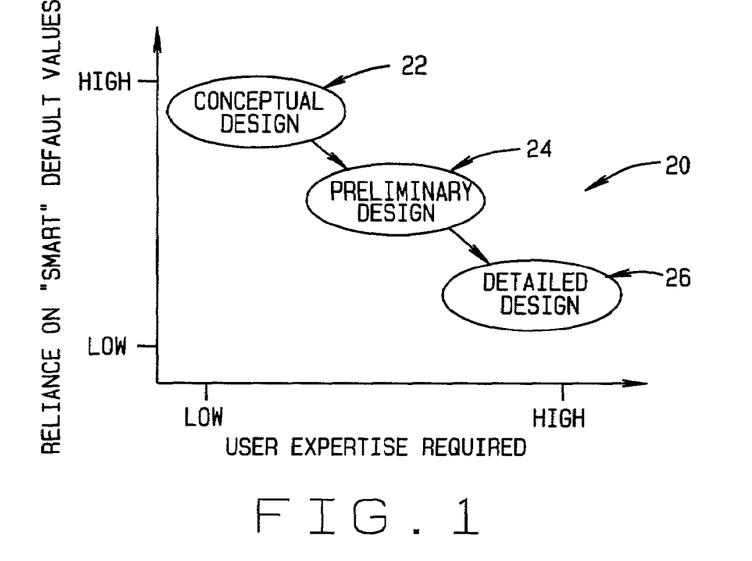
FIG. 1 is a flow diagram showing the different requirements for an interface at different design levels.

Referring to FIG. 1, a typical design project using an analysis package is shown generally therein and indicated by reference numeral 20. A design project typically begins at a conceptual design stage 22, proceeds to a preliminary design stage 24 and ends at a detailed design stage 26. As shown therein, as the design process proceeds from one stage to the next, the level of user expertise required typically increases (e.g., more user modification of variables) and the reliance on the analysis program's wrapper functions (e.g., reliance on smart default values) typically decreases as a result of the user intervention.

Figure 2:
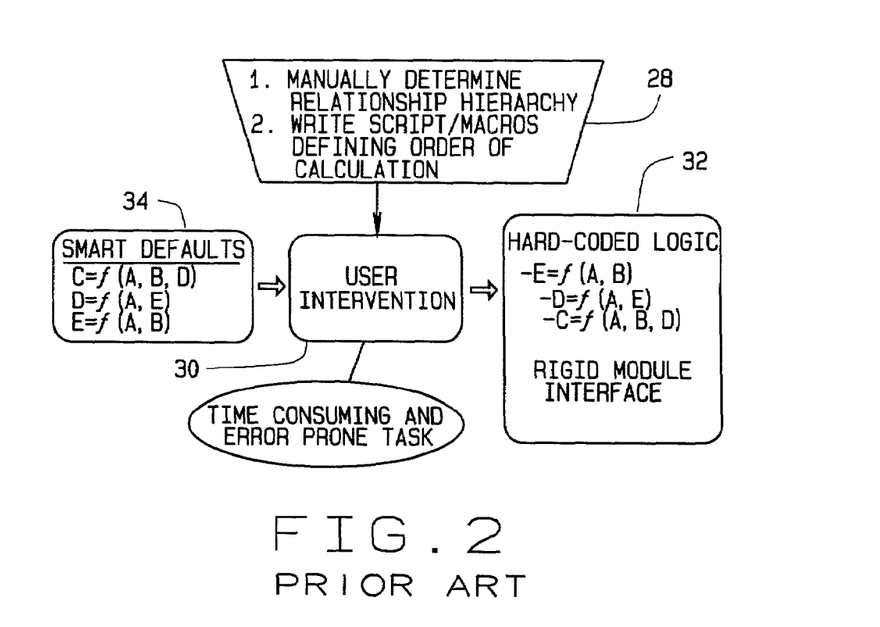
FIG. 2 is a block diagram showing a typical method for calculating smart default parameter values in a wrapped software module.
Figure 3:
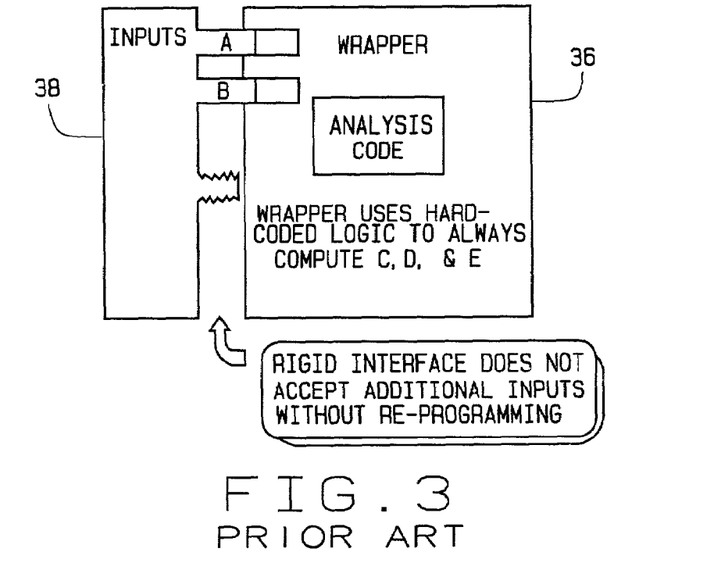
FIG. 3 is a block diagram showing a typical interface for a wrapped software module.

The present invention provides a more flexible code wrapping method and architecture which forms an interface for use during the design process 20 in combination with, for example, an analysis package. As shown in FIG. 2, defining smart defaults to compute values based upon input parameters typically required a manual determination of the relationship hierarchy between parameters, with a script or macro manually provided to define the order of parameter calculation at 28. User intervention (e.g., creating a scripting program) at 30 provided the functionality for defining hard-coded logic at 32 based upon smart defaults at 34. Smart default parameters are functions of other independent input parameters and the interface is hard-coded to accept certain parameters and to always calculate a specific predefined set or sets of default input parameter values. Thus, a wrapped code module 36 (i.e., a wrapper) having an interface accepting only specific inputs 38 and requiring reprogramming to override a smart default 34 was thereby provided as shown in FIG. 3.

Figure 4:
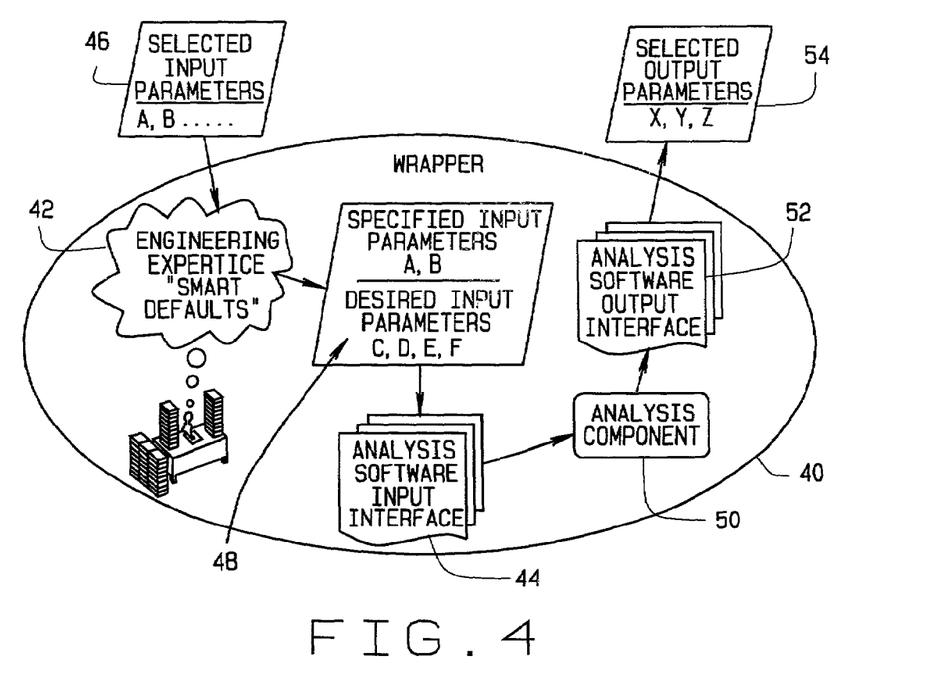
FIG. 4 is a block diagram showing a wrapper constructed according to the principles of the present invention.
Figure 5:
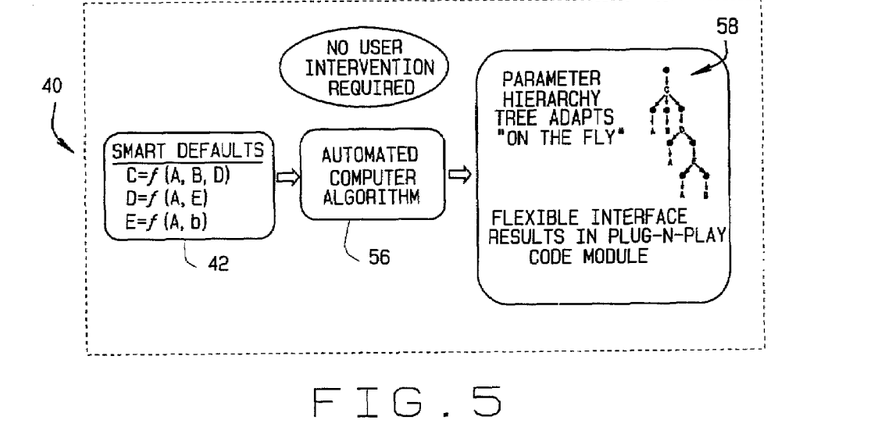
FIG. 5 is a block diagram showing a method for calculating parameter values in a wrapped software module according to the present invention.

The present invention provides a software wrapper 40 and/or architecture (e.g., an interface), and method of providing the same that incorporates smart defaults 42 based upon engineering expertise. Smart defaults provide the opportunity for experienced engineers to wrap their knowledge around analysis code. Referring specifically to FIG. 4, the present invention provides smart defaults 42 for calculating input values for an analysis software input interface 44 (e.g., input files, CORBA, remote procedure calls, etc.) based in part upon selected input parameters 46, and automatically determines parameter relationships for calculations. The wrapper 40 uses the specified input parameters 46 and derived input parameters 48, calculated by smart defaults 42, to provide the input parameter values 48 to the analysis software input interface 44 for use by, for example, an analysis package. Preferably, the present invention is provided as a software wrapper 40 for an analysis component 50 of an analysis package, which implements a method that communicates input parameters 48 to the input interface 44 and provides selected output values 54 (e.g., design values) via the output interface 52 (e.g., output files, CORBA, remote procedure calls, etc). It should be noted that the analysis component 50, or software program, may be provided in any known manner as required by the specific design requirements As shown in FIG. 5, a wrapper 40 provided by the present invention preferably calculates dependent parameters (e.g., dependent parameters based upon other dependent parameters) based upon local parameter relationships without requiring explicit specification of the order of parameter calculation (i.e., global parameter relationships determined automatically). An automated computer algorithm 56 preferably uses the smart defaults 42 to calculate all parameter values based upon specified and unspecified input parameters, preferably by descending a parameter hierarchy tree 58. The wrapper 40 of the present invention may be provided with a combination of different inputs 60, 62, 64 as shown in FIG. 6 (e.g., not all values specified), and determine unspecified parameter values as needed.

Figure 6:
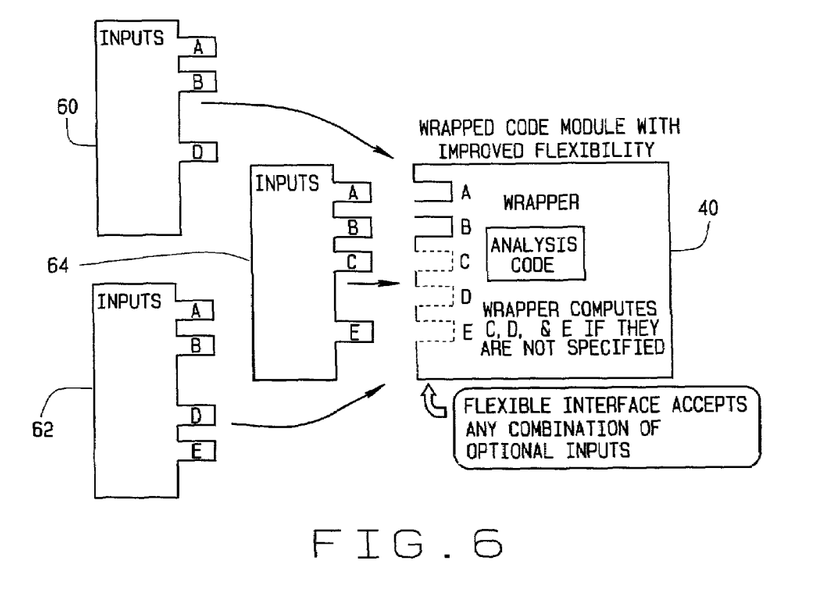
FIG. 6 is a block diagram of an interface for a wrapped software module according to the present invention.

For example, and referring to FIG. 6, if the parameters to be calculated include A, B, C, D, and E, with A and B required to be specified, and if the wrapper 40 is provided with the inputs 60 (i.e., A, B and D specified), the wrapper 40 will determine the values for the unspecified parameters C and E as described herein. If the wrapper 40 is provided with the inputs 62 (i.e., A, B, D and E specified), the wrapper 40 will determine the value for the unspecified parameter C. If the wrapper 40 is provided with the inputs 64 (i.e., A, B, C and E), the wrapper will determine the value of the unspecified parameter D. It should be noted that if the required parameters A and B are not specified (e.g., by a user), then the wrapper 40 preferably provides a notification that operation is not possible (e.g., required parameters must be specified).

The use of the recursive branching algorithm 58 as described herein provides for determining parameter relationship and calculating the values of any unspecified non-required parameters. More preferably, the branching algorithm 58 automatically determines a global parameter structure, such as if one parameter is dependent upon other parameters, which may be independent or dependent parameters, based upon local parameter relationships. The branching algorithm 58 then executes the needed functions (i.e., smart defaults 42) in an automatically determined order to calculate all of the parameter values.

Figures 7, 8, 9:
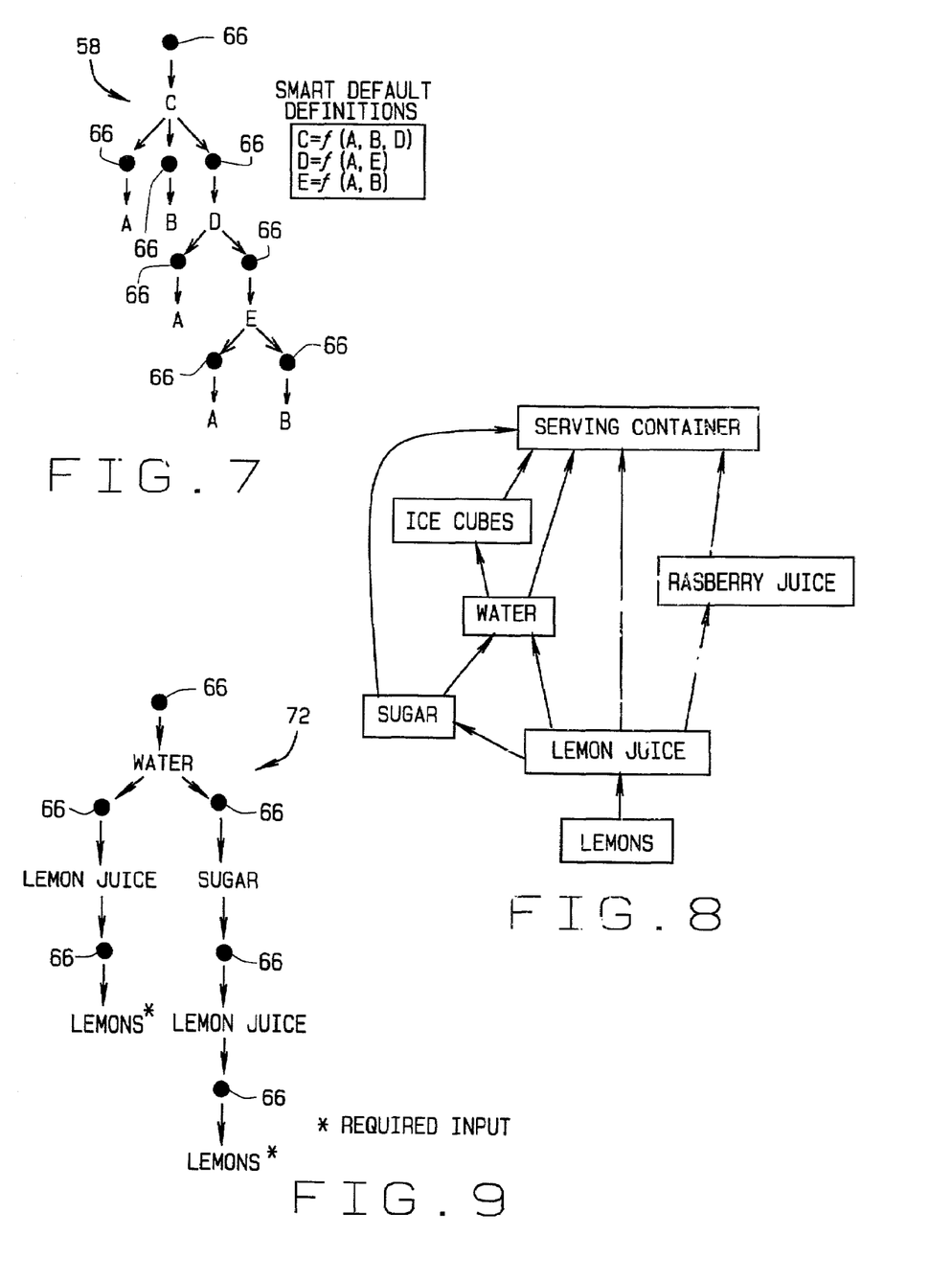
FIG. 7 is a branching structure for determining parameter values according to the present invention.
FIG. 8 is a block diagram showing an example of parameter relationships having multiple dependencies.
FIG. 9 is a tree structure for determining the parameter values of FIG. 8 according to the present invention.

As shown in FIG. 7, a subroutine 66 is preferably provided within the wrapper 40 and is executed by the wrapper 40 when needed. The wrapper 40 preferably calls the subroutine 66 to determine parameter values each time a parameter value is to be calculated (i.e., parameter relationships are determined and parameter values calculated). The subroutine 66 determines the parameter values based upon parameter types and parameter status, making use of smart defaults 42 as necessary.

The pseudo-code for a particularly preferred algorithm 58 for use with a wrapper 40 is provided as follows:
If parameter is invalid (undefined)
   return with appropriate error message;
If parameter type is "required"
   return specified parameter value;
If parameter type is "optional"
   If parameter status is "initialized"
     return parameter value specified by user (smart default override) or previously computed smart default value;
   Otherwise
     call appropriate smart default function (to compute parameter value)
     set parameter status to "initialized" (will not compute again)
     return parameter value (computed using smart default);
If parameter type is "locked"
   If parameter status is "initialized"
     return previously computed smart default value;
   Otherwise
     call appropriate smart default function (to compute parameter value)
     set parameter status to "initialized" (will not compute again) return parameter value (computed using smart default)

Preferably, if the subroutine 66 calls a smart default 42 function to determine the value of a parameter, and the function is dependent on other parameters, then the subroutine 66 is called to determine the value of each dependent parameter, which themselves may be dependent on other parameters as defined by the associated smart default 42 function or functions (i.e., indirect recursion). Thus, as shown in the example of FIG. 7, the wrapper 40, in order to calculate the value of the parameter C, must determine the values of the parameters A, B and D, upon which it is dependent. Parameters A and B are specified values (e.g., optional parameters or required parameters specified by a user) and returned by the subroutine 66. Parameter D is dependent upon parameters A and E and the wrapper 40 calls the subroutine 66 to determine the value of parameters A and E. Parameter A is a specified value and returned by the subroutine 66. Parameter E is based upon parameters A and B, which are both specified values and returned by the subroutine 66. Thus, by calling the subroutine 66 each time a parameter value is to be determined, the order of parameter calculation does not have to be specified. The subroutine 66 executes smart defaults 42 to calculate unspecified parameters as needed.

It should be noted that returning a value refers to the wrapper 40 providing a calculated parameter value or specified parameter value using known software programming methods. For example, in object-oriented programming, a parameter object may have a default method named "value," that when invoked, computes the value of the parameter and hands it back (i.e., returns) to the statement that invoked the "value" method. When referring to calling a function or routine, this means using known software programming methods to execute the function or routine. For example, this may be a simple "call" made in FORTRAN or Perl, or a method could be invoked in an object-oriented language.

A wrapper 40 of the present invention preferably includes defined input parameter types. The parameter types are preferably defined during the initial wrapping process by a user, and may include, for example, the following:

(1) Required Parameter—input parameter must be specified
(2) Optional Parameter—input parameter may be specified, otherwise if unspecified, calculated using smart defaults 42;
(3) Locked Parameter—input parameter is calculated internally using smart defaults 42.

Additional parameter types may be provided. For example, an output parameter type may be defined that determines the calculated values to output from the analysis software package.

It should be noted that a parameter is assigned the status of "initialized" once the parameter is calculated internally by a smart default 42 function or explicitly specified as an input to the wrapped module. As described herein, both required and optional parameters may be specified. If the status of optional or locked parameters is not set to initialized, the parameters are preferably re-calculated the next time the value is requested by the subroutine 66.

It should also be noted that required parameters and any desired parameter overrides (e.g., overrides of optional parameters) must be specified before a wrapper 40 of the present invention may determine the remaining locked and unspecified optional input parameters. A parameter value may be specified from one of a plurality of sources, including, for example: (1) defined directly by a user; (2) linked from the output of an upstream analysis module; or (3) provided by a software framework launching the wrapped analysis module.

Smart default 42 preferably refers to the specific programming provided as part of the wrapper 40 (e.g., coded engineering expertise) and may be created using, for example, a scripting language (e.g., PERL, Python, etc.). Depending upon the needs of the analysis program and the parameters to be calculated, the smart defaults 42 may include, for example, any type of executable routines having simple constants and/or advanced mathematical functions (e.g., predetermined functions). The scripting language may support a set of intrinsic mathematical functions, conditional statements and other programming functionality (e.g., "for" loops) for use in defining the smart defaults 42. Alternately, an external program may be provided for use by a smart default 42 in calculating a parameter value.

Input parameters are preferably checked for consistency with the defined parameter types and associated wrapper 40 rules (i.e., locked and required parameter checks) upon execution of a software module incorporating the wrapper 40. More preferably, automatic checks are performed to identify whether additional parameters need to be specified and/or whether locked parameters have been improperly specified. For example, if a required parameter has no specified value, upon execution of a software module having the wrapper 40, an indication is provided as to this condition (e.g., user interactively prompted to enter parameter value or return an error message and halt the program). As another example, if a locked parameter has been specified, an indication is provided as to this condition, such as an appropriate warning or error message. Alternately, consistency checks may be provided by the framework employing a wrapper 40, such as with a user interface.

The architecture (e.g., interface) and method of the present invention for creating a wrapper 40 may be provided with additional functionality, including, but not limited to, new and/or additional parameter types, a GUI, different input/output interface techniques and/or modification to the branching algorithm 58. Instead of incorporating the architecture and method of the present invention into a wrapper 40, all or part thereof may be provided as part of an existing framework (e.g., an MDO framework, automated analysis/design framework, etc.).

In operation, a wrapper 40 of the present invention determines a set of values for an analysis component 50 input interface 44 using specified parameters and unspecified calculated parameters such as those calculated using the smart defaults 42. The values of the unspecified parameters may be determined based upon other specified and/or unspecified parameters. For example, the present invention may be implemented to determine a set of input values for making pink lemonade. Specifically, to produce pink lemonade, the following functions (i.e., defining local relationships) may be specified to determine and/or define the quantity of each ingredient and container size needed (i.e., to determine the input values based upon the relationships of the inputs):

Water (cups)=2*(sugar (cups)+lemon juice (cups))
Lemon Juice (cups)=4.5*number of lemons
Ice Cubes (quantity)=1.5*water (cups)
Sugar (cups)=0.75* lemon juice (cups)
Raspberry Juice (cups)=0.5*lemon juice (cups)
Serving Container (pints)=0.5*(water (cups)+lemon juice (cups)+raspberry juice (cups)+sugar (cups))+(0.1*ice cubes (quantity))+1

The global structure 70 needed to define the relationship among the parameters for making pink lemonade based upon the above local equations is shown in FIG. 8. As shown therein, the parameter relationships include multiple dependencies. By generating the tree structure 58 "on the fly" in combination with smart defaults 42 and defined parameter types of the present invention, a wrapper 40 determines a specific parameter value based upon other independent or dependent parameters.

For example, if the quantity of water is to be determined, the tree structure 72 as shown in FIG. 9 may be provided by a wrapper 40 of the present invention. Specific parameter types may be defined. For example, "LEMONS" is required and "WATER" and "SERVING CONTAINER" are locked, while the remaining smart default functions are optional. The quantity of sugar, water, ice cubes, and ultimately serving container size is determined based upon the values of dependent parameters (i.e., lemon juice) and independent parameters (i.e., lemons). The wrapper 40 calculates parameter values based upon the local relationships of the parameters as shown in the smart default equations (i.e., functions) above using the tree structure 72 and calling a subroutine 66 each time a parameter value is to be calculated with a smart default 42.

Although the present invention is described as a wrapper 40 in connection with analysis programs, it should be appreciated that different or additional components may be provided as part of the wrapper 40 depending upon the particular system requirements, as in the above example, the wrapper computes inputs for a lemonade making apparatus or recipe-generating software. Further, external functionality for defining parameter types and monitoring parameter specification may be provided. Also, although parameter relationships and calculation are determined based in part on a dynamically generated structure, other structures may be provided. A wrapper 40 constructed according to the principles of the present invention may be used in combination with software modules or may be embedded within hardware components.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method executing on a computer readable medium of providing a plurality of parameter values to an interface, the parameter values based upon data inputs including required data inputs, optional data inputs and locked data inputs, the method comprising the steps of:

receiving required data input values and specified optional data input values;

performing a first set of predetermined functions to calculate data input values for non-specified optional data inputs;

performing a second set of predetermined functions to calculate data values for locked data inputs that the at least one of users and upstream computer programs are prohibited from altering;

performing the calculations without needing to predefine an order of calculation;

structuring the predetermined functions to include at least one of conditional statements, loops, references to other parameters, function calls, execution of external software code, numeric expressions and constant values;

using the calculated values for the non-specified optional data inputs and the values for the required data inputs and specified optional data inputs to determine at least some of the plurality of parameter values; and providing the plurality of parameter values for use by the interface.

2. The method according to claim 1 further comprising receiving values for at least some of the non-specified optional data inputs and using the calculated values and received values of the optional data inputs to determine some of the plurality of parameter values.

3. The method according to claim 1 further comprising providing an error indication if a value is input for any of the locked data inputs.

4. The method according to claim 1 wherein the required data inputs comprise user specified data inputs and predetermined stored data inputs and further comprising checking to ensure that all required data inputs are specified.

5. The method according to claim 4 further comprising providing an error indication if a value is not input for any of the user specified required data inputs.

6. The method according to claim 1 wherein the values of at least some of the required data inputs are provided from a computer program and further comprising confirming the entry of values for the required data inputs from the computer program.

7. The method according to claim 1 wherein the plurality of input parameter values are used by an analysis program and wherein the step of providing the plurality of parameter values further comprises configuring the values for use by the analysis program.

8. The method according to claim 7 further comprising providing the predetermined functions as a component of a wrapped program for use with the analysis program.

9. The method according to claim 1 wherein the step of performing predetermined functions further comprises recursively performing the predetermined functions.

10. The method according to claim 9 further comprising employing a branching structure for recursively performing the predetermined functions.

11. A method executing on a computer readable medium of providing a wrapped component as part of a software program, the wrapped component using data parameters to determine values for a plurality of inputs required by the software program, the method comprising the steps of:

employing a plurality of data parameter types for use in determining the plurality of inputs, said plurality of data parameter types including reguired data inputs, optional data inputs and locked data inputs;

identifying the data parameters based upon parameter type;

receiving values for at least some of the data parameters of a specific parameter type;

calculating values for at least some of the data parameters of a specific parameter type using predetermined functions;

performing the calculations without needing to predefine the order of calculation;

structuring the predetermined functions to include at least one of conditional statements, loops, references to other parameters, function calls, execution of external software code, numeric expressions and constant values;

determining values for at least some of the plurality of inputs for use by the software program based upon the data parameter values; and providing the plurality of input values from the component to the software program.

12. The method according to claim 11 wherein the step of calculating values comprises recursively using the predetermined functions to calculate the values.

13. The method according to claim 11 further comprising specifying at least some of the optional data inputs.

14. The method according to claim 13 wherein the step of calculating values for at least some of the parameters further comprises calculating values for optional data inputs not specified.

15. A method executing on a computer readable medium for determining the value of each of a plurality of parameters for use as an input file to a computer program, the parameters including required, optional and locked parameters, and the method comprising the steps of:

determining the specific parameters to provide as part of the input file;

receiving values for the required parameters and any optional parameter having a specified value;

checking that values for the required parameters to be included as part of the input file are specified, and if not specified, providing an error indication;

identifying optional parameters not specified to be included as part of the input file;

calculating the value of each of the identified non-specified optional parameters and each locked parameter;

performing the calculations without needing to predefine the order of calculation;

structuring the calculations to include at least one of conditional statements, loops, references to other parameters, execution of external software code, numeric expressions and constant values; and providing parameter values as part of the input file for use by the computer program.

16. The method according to claim 15 further comprising providing an error indication for a locked parameter that is input.

17. The method according to claim 15 further comprising employing a recursive branching structure for calculating the identified non-specified optional and locked parameter values.

18. An interface executing on a computer readable medium for guiding a user to provide a data set to a complex computer program, and providing the data set to the complex computer program, the interface comprising:

means for accepting input of at least one required user input from a user;

means for accepting input of at least one optional user input from a user, and in the absence of an input of an optional user input, calculating a default input based upon a first predetermined formula using a recursive algorithm; and means for generating at least one locked input and using a second predetermined formula to calculate values for said locked input that at least one of users and upstream computer programs are prohibited from setting or overriding;

performing said predetermined functions without needing to predefine an order of calculation;

structuring said predetermined functions to include at least one of conditional statement, loops, references to other parameters, function calls, execution of external software code, numeric expressions and constant values; and means for providing the data set of inputs to the complex computer program.

19. The interface according to claim 18 wherein the predetermined formula for calculating the default input depends upon at least one mandatory user input.

20. The interface according to claim 18 wherein the means for generating at least one fixed input comprises means for calculating the at least one locked input based upon at least one required user input.

21. The interface according to claim 18 wherein the means for generating at least one locked input comprises means for calculating the at least one locked input based upon at least one optional user input.

* * * * *